Oct. 2, 1956     L. G. BECKETT ET AL     2,764,875

HOUSEHOLD REFRIGERATORS OF THE TWO TEMPERATURE TYPE

Filed Jan. 26, 1955     4 Sheets-Sheet 1

INVENTORS
Leo G. Beckett &
Edward R. Wolfert
BY: Robert H. Wendt
Atty.

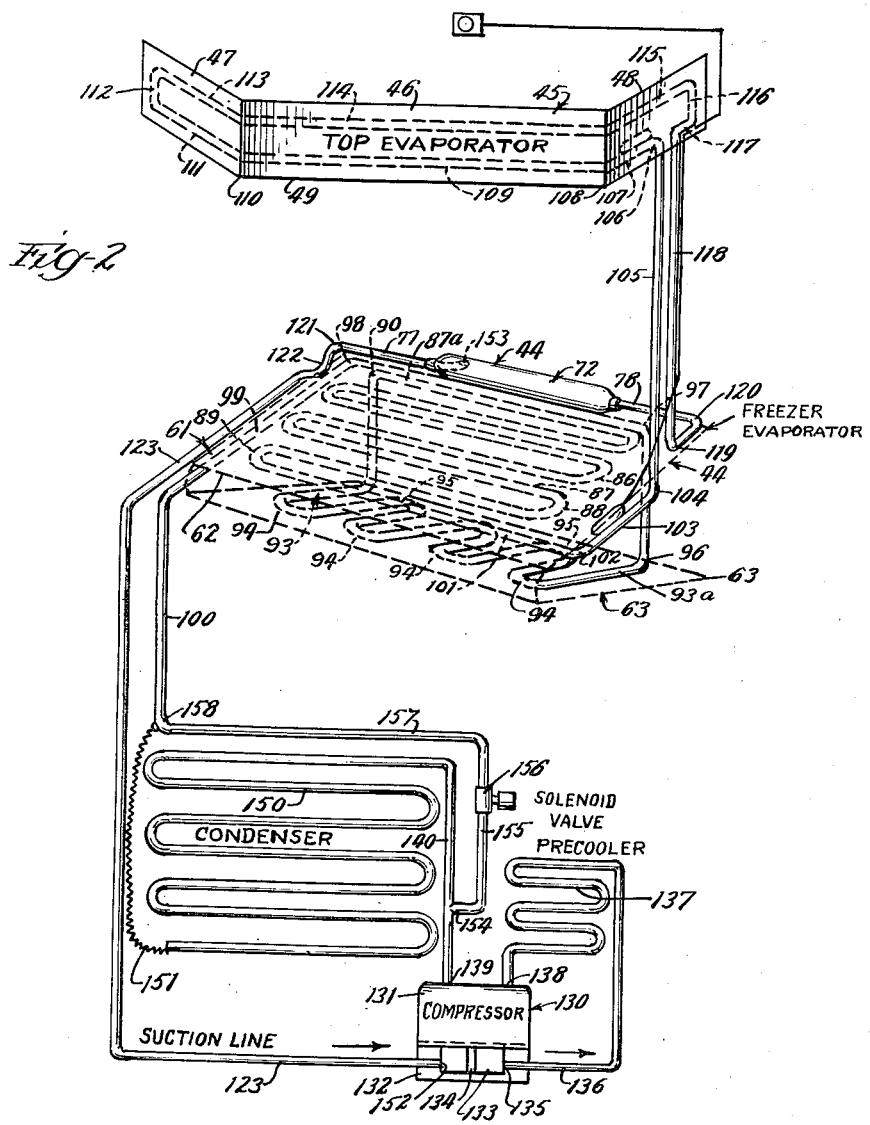

Oct. 2, 1956     L. G. BECKETT ET AL    2,764,875
HOUSEHOLD REFRIGERATORS OF THE TWO TEMPERATURE TYPE
Filed Jan. 26, 1955                     4 Sheets-Sheet 3
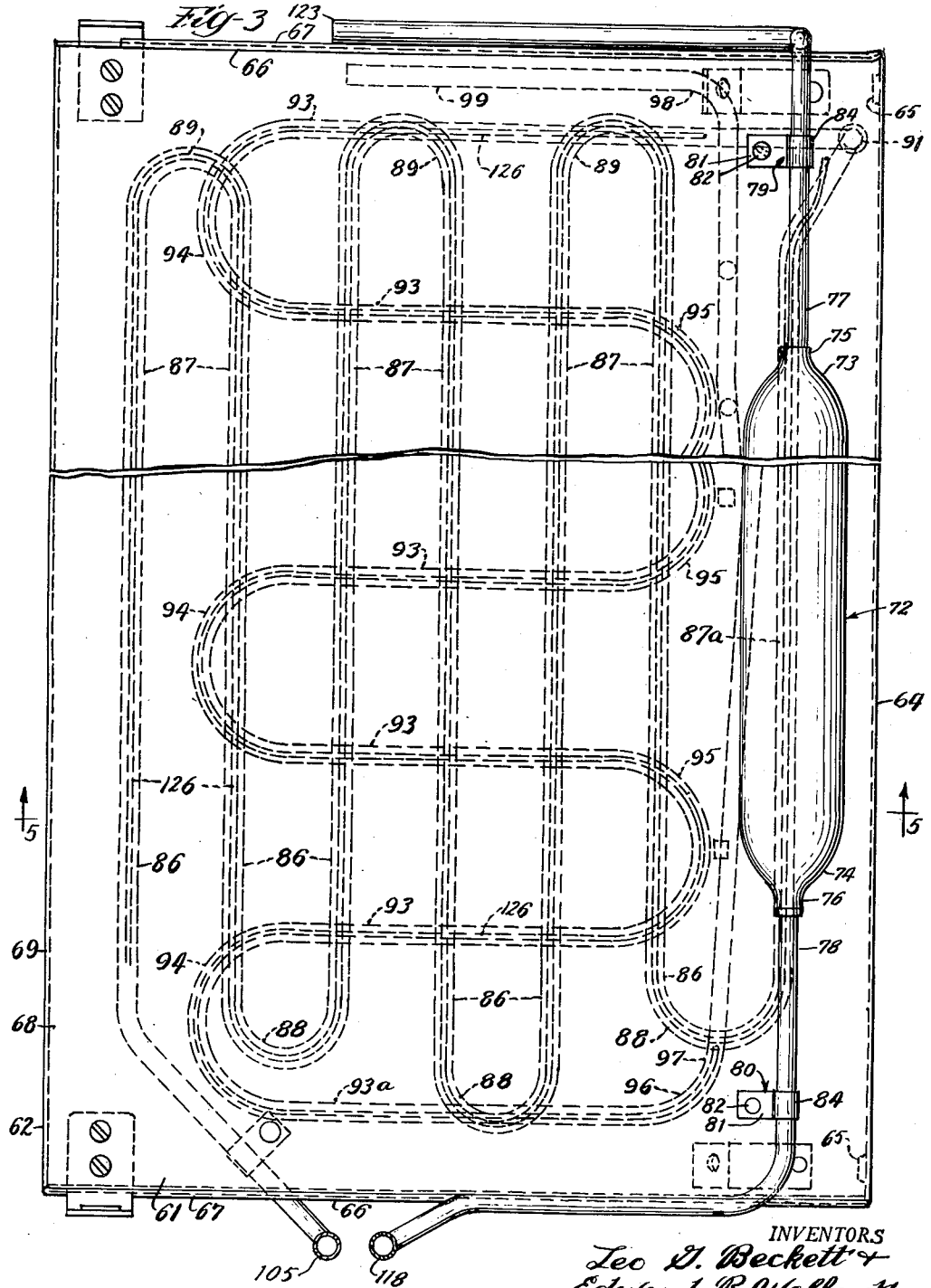
INVENTORS
Leo G. Beckett &
Edward R. Wolfert
By:
Robert H. Wendt
Atty.

Oct. 2, 1956 — L. G. BECKETT ET AL — 2,764,875
HOUSEHOLD REFRIGERATORS OF THE TWO TEMPERATURE TYPE
Filed Jan. 26, 1955 — 4 Sheets-Sheet 4
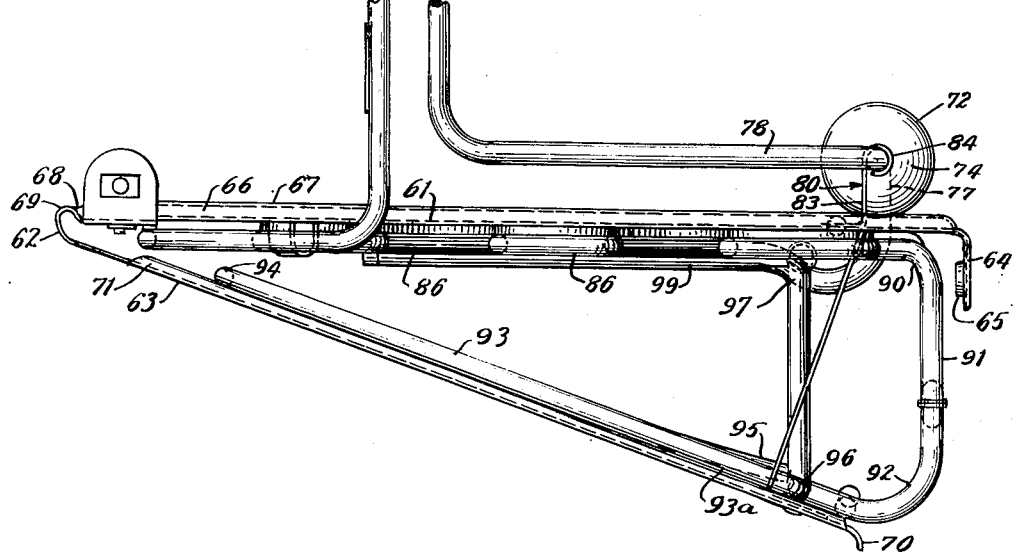
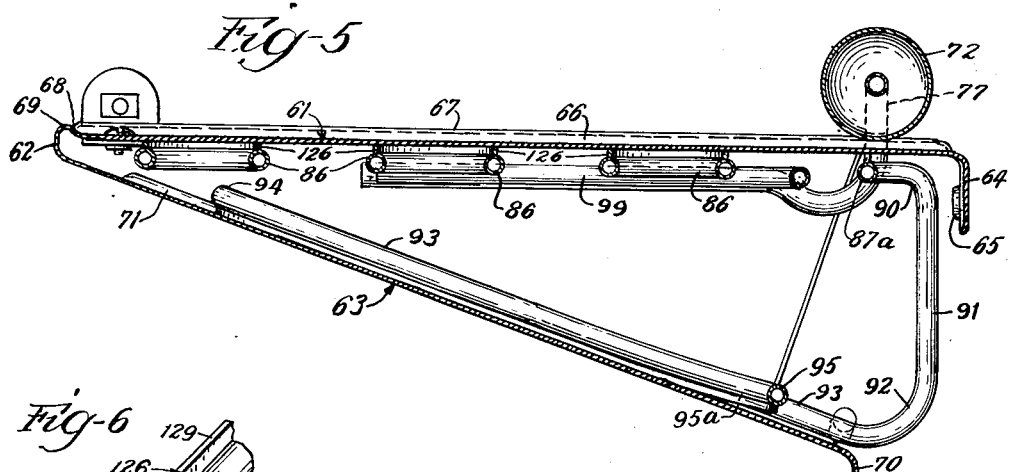
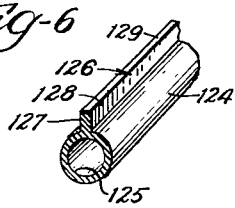
INVENTORS
Leo G. Beckett +
Edward R. Wolfert
By: Robert H. Wendt
Atty.

2,764,875

HOUSEHOLD REFRIGERATORS OF THE TWO TEMPERATURE TYPE

Leo G. Beckett, Henderson, Ky., and Edward R. Wolfert, Evansville, Ind., assignors, by mesne assignments, to Whirlpool-Seeger Corporation, St. Joseph, Mich., a corporation of Delaware Application January 26, 1955, Serial No. 484,096

14 Claims. (Cl. 62—103)

The present invention relates to household refrigerators of the two temperature type and is particularly concerned with improvements in the evaporator which is used to cool the frozen food compartment of such a refrigerator and to maintain a gradient of temperature between the freezing zone evaporator and the upper part of the refrigerator, which is also provided with an evaporator for aiding in the cooling of the space for unfrozen food.

One of the objects of the invention is the provision of an improved below-freezing evaporator for cooling the frozen food compartment of a two temperature zone refrigerator and for also aiding in the cooling of the storage space for unfrozen food, which is separated from the frozen food compartment by a partition.

Another object of the invention is the provision of an improved evaporator for cooling frozen food and for freezing food, which is adapted to drain all moisture accumulating on the evaporator to the rear part of the evaporator, where it is drained to the bottom of the liner, and to eliminate the dripping of condensate on the food that is stored in the frozen food compartment.

Another object of the invention is the provision of an improved evaporator structure which is provided with a plurality of sheet metal surfaces having sinuous coils arranged thereon for carrying refrigerant, and having the coils so arranged that any condensate may be drained past the coils to the rear part of the evaporator, where it is deposited upon a liner wall and kept away from the inside of a frozen food drawer.

Another object of the invention is the provision of an improved multiple evaporator assembly for household refrigerators of the two temperature type, including an upper evaporator of shape adapted to be located close to the side walls and rear wall of the liner, leaving a maximum open space for storage in the unfrozen food compartment, and having a lower evaporator provided with a pair of sheet metal panels joined at the front, and including one horizontal panel and one diagonally extending lower panel for catching any condensation and draining it to the rear of the lower evaporator, where it is deposited upon and drained from the floor of the liner without falling upon food stored in the frozen food compartment.

Another object of the invention is the provision of an improved evaporator for the frozen food compartment which is adapted to be quickly defrosted and drained of condensate and also adapted to be quickly cooled again, when free of frost and condensate, to accomplish a defrost in a limited time without deleteriously affecting the frozen food stored in the frozen food compartment or the unfrozen food stored above the evaporator.

Other objects and advantages of the invention will be apparent from the following description and the accompanying drawings, in which similar characters of reference indicate similar parts throughout the several views.

Referring to the four sheets of drawings accompanying this specification,

Fig. 2 is a diagrammatic illustration of the refrigeration system and of the evaporator assembly;

Fig. 3 is a top plan view of the lower evaporator;

Fig. 4 is a side elevational view of the evaporator of Fig. 2;

Fig. 5 is a sectional view taken on the plane of the line 5—5 of Fig. 3, looking in the direction of the arrows;

Fig. 6 is a view in perspective of a short length of the evaporator tubing, which is preferably employed.

Figure 1:
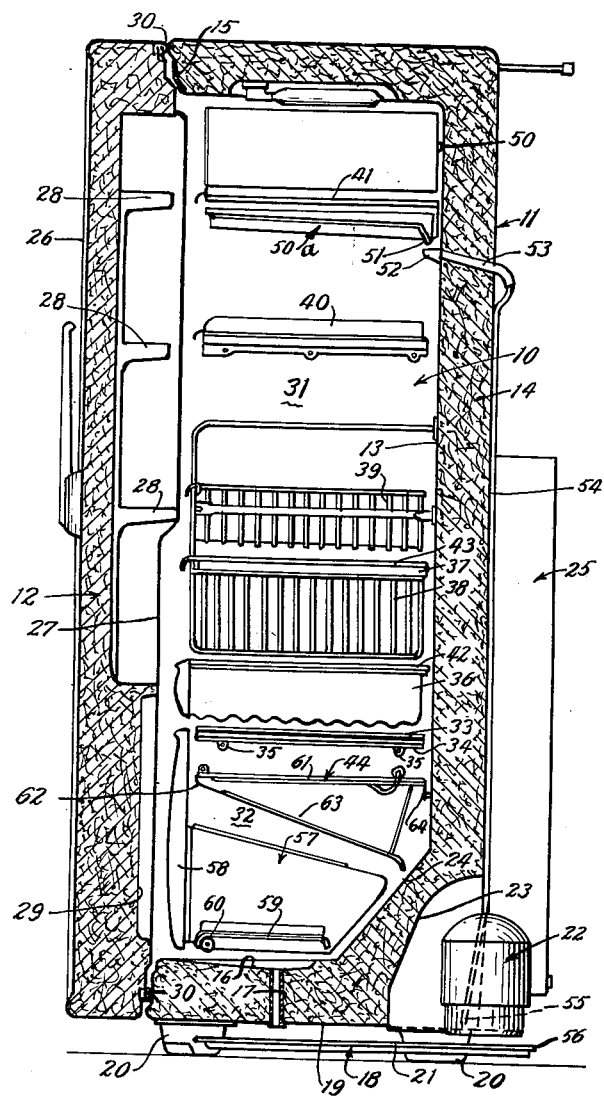
Fig. 1 is a diagrammatic sectional view taken on a vertical plane passing through a household refrigerator embodying the invention.

Referring to Fig. 1, the refrigerator 10 embodying the invention is preferably provided with an outer metal shell 11 having top, sides, and rear, and bottom panels, and open at the front, but provided with an insulated door 12.

The outer shell 11 is separated from an inner metal liner 13 by suitable insulation 14; and the two shells are joined around the door opening by breaker strips 15 of insulating material. The liner 13 also includes side, rear, top, and bottom panels; and the bottom panel 16 of the liner is adapted to drain to a drain tube 17 extending through both shells and draining condensate from the bottom to a lower condensation evaporation pan 18.

The bottom 19 of the cabinet carries a plurality of metal foot pads 20 welded to it and located at the four corners of the bottom, and spacing the cabinet bottom 19 from the floor. Suitable guides carried by bottom panel 19 engage below the side flanges 21 of the evaporation pan and support it beneath the bottom panel 19 and beneath the motor compressor 22, the pan extending from a point near the front of the cabinet to a point beyond the rear side of the motor compressor.

The cabinet of the refrigerator 10 has its outer shell 11 provided with a cavity 23 at the lower rear corner for receiving part of the motor compressor 22; and the liner is provided with a diagonal wall 24 at the same corner, leaving space between the shell and liner at this point for insulation.

The rear panel of the shell 11 carries a preliminary cooling condenser and a main condenser, further to be described and diagrammatically indicated by the rectangle 25.

The door 12 comprises an outer metal shell 26 bordered by an inwardly projecting flange which supports an inner shell 27, which may be of metal or fiber or sheet plastic; and the inner shell is preferably recessed for receiving a plurality of shelves 28 and other containers, such as that at 29 for receiving the wrappings for frozen food.

The door is bordered by a rubber door seal 30 engaging the face of the outer shell 11 about the door opening for excluding external air and preventing leakage of cold air.

Within the cabinet 10 the space is preferably divided into an upper compartment 31 for unfrozen food and a lower compartment 32 for ice cubes and frozen food, these compartments being separated by a plurality of insulating plates 33, 34 of glass or sheet plastic spaced from each other and spaced slightly from the inner walls of the liner 13 to permit condensate to run down the wall.

Partition plates 33, 34 are carried by suitable right angular guides 35 secured to the side walls of the liner. Above the partition 33, 34 the unfrozen food compartment 31 contains a plurality of shelves, drawers, baskets, and the like, all of which are mounted upon right angle guides carried by the side walls of the liner, such as the meat and beverage drawer 36, a plurality of crisper drawers 37 separated by an intermediate egg basket 38, a milk basket 39, a removable tray shelf 40, and an upper wire shelf 41.

The bottle drawer 36 and crispers 37 are also provided with glass or plastic covers 42, 43; and the temperatures in the upper compartment 31 gradually decrease toward the top, depending upon the proximity of the particular level to the partition 33, 34 beneath which is located the freezing evaporator 44.

The evaporator assembly is shown in Fig. 2, comprising the freezer evaporator 44 and the top evaporator 45 connected by suitable tubing.

The top evaporator comprises a rectangular sheet of aluminum which is long enough to traverse the back of the liner by means of the back portion 46 and to traverse the side walls of the liner by means of the forwardly extending portions 47, 48. The sheet metal portion of the top evaporator 45 is carried by the side walls of the liner by means of suitable bolts or other fasteners 50 with spacers which space the top evaporator 45 from the liner by an amount permitting the tubing to be located between the evaporator sheet and the liner.

This locates the lower edge 49 of the top evaporator at a point spaced from the liner wall so that any condensate dripping therefrom may drop into the molded plastic trough which has its inside sloping from the front to back and across the back to a discharge port 51, which discharges condensate into a funnel shaped member 52 of plastic or rubber, which communicates with a flexible tube 53 leading to the vertical tube 54, which extends down the back panel to the point 55.

The evaporation pan 18 receives the condensate; and the condensate is spread over its bottom, which has a relatively large area extending from side to side between the foot pads 20, and from a point near the front to its rear edge 56 located outside the compressor 22.

The frozen food chamber 32 is provided with a lower drawer or basket 57, which is provided with a flat bottom, trapezoidal sides, and rectangular rear wall, and carries a drawer facing 58, which may comprise a hollow shell of plastic or metal having a dead air space inside. The drawer 57 is mounted for rolling in and out on guides 59 carried by the drawer and by the liner and provided with rollers 60 over which the drawer tilts forwardly and downwardly so that the drawer facing exposes the space above the evaporator 44 and makes the contents of the drawer more accessible.

The size of the drawer facing 58 is such as to extend substantially from side to side of the inner liner 13 with a clearance and from the bottom 16 to a point flush with the top of the partition 33, 34.

Thus the drawer facing effects a substantial closure of the front of the frozen food compartment 32, but does not make an air-tight closure.

Referring to Fig. 2, this is a diagrammatic illustration of the defrosting system and the refrigerator system including the evaporator assembly. The evaporator 44 preferably comprises a horizontal sheet 61, which may be integrally joined at its forward end, 62, by an easy bend to a backwardly and downwardly extending diagonal sheet 63.

The upper sheet is provided at its rear edge with a downwardly turned attaching flange 64, which is doubled back on itself and provided with a plurality of apertures 65 for supporting members which are secured with spacers to the rear liner wall 13.

At each of its side edges the horizontal upper sheet 61 is provided with an upwardly turned border flange 66, which is bent backwardly on itself at its upper edge 67 with a U-bend to eliminate the sharp edge. At its forward edge the evaporator plate 61 (Fig. 5) has an upward bend 68 leading to an upwardly extending rounded rib 69, which prevents ice trays from sliding off the shelf.

The upper plate 61 is integrally joined to an easy bend 62, which carries the downwardly extending diagonal sheet 63. This diagonal sheet extends to a point adjacent the rear diagonal wall 24 of the liner, on which it drains; and it has a downwardly turned curved edge 70, from which the condensate drips on the bottom of the liner at the wall 24.

All parts of the drawer 57 are forwardly, that is, to the left in Fig. 1, of the diagonal plate 63, which protects the drawer from drippage that might come off the evaporator 44 during defrosting.

The diagonal plate 63 is also provided at its lateral edges with an upwardly extending border flange 71 along each edge for confining the drippage to the portions of the plate between the flanges 71.

The evaporator plate 61 is provided on its upper side with an enlarged tubular receiver or accumulator 72, both ends of which are spun down to a rounded and tapered formation 73, 74, each of which terminates in a tubular formation 75, 76, having a cylindrical aperture large enough to receive the tubing 77 and 78, which is soldered and sealed in each end of the accumulator 72.

The receiver is supported in spaced relation to the top of the upper plate 61 by a pair of sheet metal supporting brackets 79 and 80, each of which has a right angle attaching flange 81, which is riveted to the top plate 61 at 82, and each of which has an upstanding flange 83 and a cylindrical portion 84, gripping the tubes 77 and 78.

The column portion 83 of each bracket is long enough to support the receiver in spaced relation to the upper plate. The upper plate 61 is provided with a plurality of sinuous tubular formations 86 extending from side to side on the bottom of said plate with straight portions 87 that are joined by U shaped formations 88 and 89 at each end, substantially covering the bottom from front to rear with such coils.

At the rearmost pass 87a of these straight portions (Fig. 2) the tubing is turned downwardly at 90 and extends vertically at 91 to an easy bend 92 (Fig. 5) adjacent the lower plate 63. On the lower plate 63 the tubing has a plurality of sinuous formations extending forwardly and backwardly with straight parts 93, which are joined by U-shaped formations 94 at the front and 95 at the back; and in this case the tubing is arranged on the top of the plate 63.

The last forwardly and backwardly extending straight pass 93a of tubing on the lower plate 63 is bent upwardly at 96 to the lower side of the top plate, where it is bent laterally at 97, and forms a horizontal pass on the lower side of the top plate 61, which is bent forwardly at 98 and joined by means of a forward pass 99 with the inlet tubing 100 of the evaporator.

Referring to Fig. 2, the sinuous formations 86 on the bottom of the top plate extend forwardly to the last front pass 101, where the tube is turned at right angles at 102 at the right end, extending horizontally at 103 and upwardly at 104. 105 indicates the upwardly extending tube, which carries refrigerant from the lower evaporator 44 to the upper evaporator 45.

On the upper evaporator the tubing is arranged on the outside of the evaporator, which includes the back plate and the two side plates 47 and 48.

The evaporator is spaced from the liner by suitable spacers; and the tubing is arranged as follows:

At 106 the tube 105 is bent to provide a horizontal portion 107 extending backwardly on the side plate 48. This curves about the corner 108 of the evaporator and has a portion 109 extending across the back plate 46 at 110. This tube then extends forwardly at 111 on the outside of the plate 47 to a point adjacent its front edge, where it has an upwardly extending portion 112 joined to a rearwardly extending portion 113.

This is joined to a horizontal pass 114 on the back of the plate 46 near its upper edge, which is joined to a forward pass 115 on the side plate, where it extends downwardly at 116, backwardly at 117, and down the joining tube 118.

The tubes 105 and 118 join the upper evaporator to the lower evaporator assembly. At 119 the tube 118 extends backwardly and is curved laterally at 120 to the previously mentioned tube 78, which is connected to the receiver 72. From the receiver tube 77 extends to the edge of the upper evaporator plate, where it is bent forwardly at 121 and provided with a curved portion 122 for passing around an adjacent transverse tube and with a forwardly extending portion 123, which is the suction line.

The tubing which is employed on the evaporators is preferably of the type shown in Fig. 6, which shows a short section of extruded tubing having an outer cylindrical surface 124, an inner cylindrical bore 125, and a radially extending fin 126.

The fin 126 is an integral part of the extruded tube and has a pair of flat parallel sides 127, 128 and a plane edge 129. Wherever the tubing is bent at a corner, the fin may be cut away, especially if the bend is in the plane of the fin 126; but where the bend is transverse to the fin 126, the fin will involve no difficulty in bending.

The tubing exemplified in Fig. 6 is preferably secured to the evaporator plates 61, 63, 46, 47, 48 by being integrally soldered or welded or brazed at the plane edge 129 of the finned tubing. By using tubing having the radial fin 126 secured to the evaporator sheets, the heat is conducted from the sheets to the tubing, as well as if the tube itself were secured to the sheet; but the tube is spaced from the sheet metal in each case; and there is no possibility of ice forming in the soldered, brazed, or welded joint between the tube and the sheet, which sometimes causes punctures in the tubing of the prior art, which was secured directly to the sheet metal sheet.

The expansive action of freezing water between a tube and a sheet sometimes punctures the tube; but this cannot happen where the tube is spaced from the sheet by a rib.

By spacing the receiver 72 from the upper sheet 61 of the evaporator puncturing of the receiver by expansive action of freezing water is also avoided.

It should be noted that in the arrangement of tubing on the lower plate 63 there are no horizontal passes which would interfere with the flow of condensate down the plate. In order to permit the condensate to drain down the plate 63 the rear U-shaped formations 95 are bent upwardly and spaced from the plate at 95a so that the condensate may run under them along the plate, where the fin may be spaced from the plate or removed.

Referring to Fig. 2, the refrigeration system preferably includes a motor compressor 130, including an upper motor housing 131 having a lower oil sump 132 surrounding the compressor 133, which is attached to the motor and driven by the same shaft.

The compressor 133 may be immersed in oil in the sump 132; and it may have an inwardly extending oil conduit 134, carrying oil to a point of suction in the compressor chambers or to the inlet of the compressor so that oil is pumped as well as refrigerant, lubricating the compressor and motor parts.

The outlet of the compressor is at 135 to a tube 136, which extends through the wall of the oil sump 132 and carries the hot compressed gaseous refrigerant and entrained oil to a sinuous precooler coil 137, which is of sufficient size and area of radiating fins, wire, or other surfaces to partially condense the refrigerant.

The partially condensed refrigerant and entrained oil is returned under pressure to the top of the motor housing at 138, where the oil and refrigerant run down and over the motor parts, the oil going to the oil sump and the refrigerant being revaporized by the hot motor parts to cool them by absorbing the heat of vaporization.

Refrigerant vapor and oil in the housing members 131, 132 are under high compression, forcing the oil into the compressor conduit 134 to effect lubrication; and the vapor is taken from the motor housing 131 at 139 by the tube 140 leading to the sinuous tubing 150 of the main condenser, which is likewise provided with radiating fins, wires, or sheet metal in heat conducting relation with the tubing.

The main condenser 150 and the precooler 137 may be entirely separate from each other or they may comprise selected passes of the same tubing assembly secured to the same fins or wires, but having different inlets and outlets.

The main condenser tubing 150 is connected by a capillary tube restrictor 151 to the evaporator inlet tube 100. The course of the refrigerant through the evaporators is as follows:

Refrigerant first goes to the tube 99 and to bends 98, 97, 96 and to the sinuous tubing 93 on the lower plate 63. From the tubing 63 the refrigerant goes through a continuous tube to points indicated at 90 and to the sinuous tubing formations 86 on the top plate 61, which terminate at 102, and are joined by tubing 103, 104, 105 to the top evaporator.

In the top evaporator the refrigerant passes through tubing 107, 109, 111, 112 to 117, inclusive, and down the tubing 118 to the received 72. From the receiver 72 the refrigerant passes through tubing 77, 121, 122, 123 and through this suction line to the inlet 152 of the compressor. The suction tube 123 carries the refrigerant through the wall of the oil sump 132 directly to the compressor.

In the receiver 72 the suction tube has an upwardly turned open end 153 for taking vapor from the receiver and leaving liquid in the bottom of the receiver.

There is a by-pass tube which joins the tubing 140 at 154 and extends upward at 155 to a solenoid valve 156 that is normally closed during refrigeration. From the solenoid valve there is tubing 157 extending to the tubing 100 at 158, by-passing both the main condenser 150 and the capillary restrictor 151 when the solenoid valve is opened.

The present refrigerator is of the type which utilizes the absorption of refrigerant, such as F12 to automatically regulate the temperature in the unfrozen food space, while maintaining the below-freezing temperatures at all times in the frozen food zone.

To accomplish this result the amount of oil and the amount of refrigerant employed and the volumes of all of the refrigerant spaces in the compressor, preliminary cooler, main condenser, and evaporator are so proportioned that there is sufficient refrigerant available at ordinary room temperatures to cool the below-freezing evaporator at all times; but the upper evaporator is starved of refrigerant because a certain amount of refrigerant is absorbed in the oil.

As the ambient temperature drops more refrigerant is absorbed in the oil; and less refrigerant becomes available for cooling the upper evaporator. As the ambient temperature rises less refrigerant is absorbed in the oil and a greater cooling effect is required at the upper evaporator; but there is more refrigerant available for this cooling effect. Thus the temperature in the unfrozen food space is automatically regulated to avoid excessive cooling in this zone.

It will thus be observed that we have invented an improved refrigerator structure in which the dripping of condensate from the lower evaporator on the frozen food is eliminated, the condensate dropping on a lower, sloping evaporator plate on which it is carried to the rear of the frozen food chamber beyond the frozen food basket; and the condensate is drained on the rear sloping wall to the bottom of the liner, from which it runs into a condensate evaporation pan.

While we have illustrated a preferred embodiment of our invention, many modifications may be made without departing from the spirit of the invention, and we do not wish to be limited to the precise details of construction

Having thus described our invention, what we claim as new and desire to secure by Letters Patent of the United States, is:

1. In a household refrigerator, the combination of an insulated cabinet having an outer shell and an inner liner separated by insulation, and having a door opening closed by an insulated door, said liner having top, side, and rear walls defining a refrigerated space divided into an upper zone for unfrozen food and a lower zone for frozen food, a pair of spaced insulating sheet members forming a partition separating the refrigerated space into said zones, an upper evaporator comprising a sheet of metal having bends at the corners to conform to the inside of said liner extending across both sides and the back, and having refrigeration coils on the outside thereof, a freezing evaporator located in said frozen food space and comprising a sheet of metal forming a substantially horizontal plate and extending from side to side and from front to rear of the frozen food zone, with a clearance on all sides for passing of condensate on the walls, said plate being joined at its front edge to a backwardly and downwardly extending metal evaporator plate, both said plates having sinuous coils mounted thereon, and the sinuous coils being connected together and connected to the coils of the upper evaporator without restriction, the refrigerant going first to the freezing evaporator and thereafter to the upper evaporator.

2. In a household refrigerator, the combination of an insulated cabinet having an outer shell and an inner liner separated by insulation, and having a door opening closed by an insulated door, said liner having top, side, and rear walls defining a refrigerated space divided into an upper zone for unfrozen food and a lower zone for frozen food, a pair of spaced insulating sheet members forming a partition separating the refrigerated space into said zones, an upper evaporator comprising a sheet of metal having bends at the corners to conform to the inside of said liner extending across both sides and the back, and having refrigeration coils on the outside thereof, a freezing evaporator located in said frozen food space and comprising a sheet of metal forming a substantially horizontal plate and extending from side to side and from front to rear of the frozen food zone, with a clearance on all sides for passage of condensate on the walls, said plate being joined at its front edge to a backwardly and downwardly extending metal evaporator plate, both said plates having sinuous coils mounted thereon, and the sinuous coils being connected together and connected to the coils of the upper evaporator without restriction, the refrigerant going first to the freezing evaporator and thereafter to the upper evaporator, the said freezing zone being closed on its front by a hollow drawer facing extending from the bottom of the liner to the level of said partition and from side to side of said liner with a clearance to effect a substantial closure of the front of said freezing zone.

3. In a household refrigerator, the combination of an insulated cabinet having an outer shell and an inner liner separated by insulation, and having a door opening closed by an insulated door, said liner having top, side, and rear walls defining a refrigerated space divided into an upper zone for unfrozen food and a lower zone for frozen food, a pair of spaced insulating sheet members forming a partition separating the refrigerated space into said zones, an upper evaporator comprising a sheet of metal having bends at the corners to conform to the inside of said liner extending across both sides and the back, and having refrigeration coils on the outside thereof, a freezing evaporator located in said frozen food space and comprising a sheet of metal forming a substantially horizontal plate and extending from side to side and from front to rear of the frozen food zone, with a clearance on all sides for passage of condensate on the walls, said plate being joined at its front edge to a backwardly and downwardly extending metal evaporator plate, both said plates having sinuous coils mounted thereon, and the sinuous coils being connected together and connected to the coils of the upper evaporator without restriction, the refrigerant going first to the freezing evaporator and thereafter to the upper evaporator, the said freezing zone being closed on its front by a hollow drawer facing extending from the bottom of the liner to the level of said partition and from side to side of said liner with a clearance to effect a substantial closure of the front of said freezing zone, a drawer carrying said drawer facing and slidably mounted in said liner below said plates, the lower of said plates extending backwardly beyond said drawer and draining all condensate to the back of said liner beyond said drawer.

4. In a household refrigerator, the combination of an insulated cabinet having an outer shell and an inner liner separated by insulation, and having a door opening closed by an insulated door, said liner having top, side, and rear walls defining a refrigerated space divided into an upper zone for unfrozen food and a lower zone for frozen food, a pair of spaced insulating sheet members forming a partition separating the refrigerated space into said zones, an upper evaporator comprising a sheet of metal having bends at the corners to conform to the inside of said liner extending across both sides and the back, and having refrigeration coils on the outside thereof, a freezing evaporator located in said frozen food space and comprising a sheet of metal forming a substantially horizontal plate and extending from side to side and from front to rear of the frozen food zone, with a clearance on all sides for passage of condensate on the walls, said plate being joined at its front edge to a backwardly and downwardly extending metal evaporator plate, both said plates having sinuous coils mounted thereon, and the sinuous coils being connected together and connected to the coils of the upper evaporator without restriction, the refrigerant going first to the freezing evaporator and thereafter to the upper evaporator, the said freezing zone being closed on its front by a hollow drawer facing extending from the bottom of the liner to the level of said partition and from side to side of said liner with a clearance to effect a substantial closure of the front of said freezing zone, a drawer carrying said drawer facing and slidably mounted in said liner below said plates, the lower of said plates extending backwardly beyond said drawer and draining all condenstate to the back of said liner beyond said drawer, said latter plate being provided on its lateral edges with upwardly extending flanges, preventing condensate from running off the lateral edges.

5. In a household refrigerator, the combination of an insulated cabinet having an outer shell and an inner liner separated by insulation, and having a door opening closed by an insulated door, said liner having top, side, and rear walls defining a refrigerated space divided into an upper zone for unfrozen food and a lower zone for frozen food, a pair of spaced insulating sheet members forming a partition separating the refrigerated space into said zones, an upper evaporator comprising a sheet of metal having bends at the corners to conform to the inside of said liner extending across both sides and the back, and having refrigeration coils on the outside thereof, a freezing evaporator located in said frozen food space and comprising a sheet of metal forming a substantially horizontal plate and extending from side to side and from front to rear of the frozen food zone, with a clearance on all sides for passage of condensate on the walls, said plate being joined at its front edge to a backwardly and downwardly extending metal evaporator plate, both said plates having sinuous coils mounted thereon, and the sinous coils being connected together and connected to the coils of the upper evaporator without restriction, the refrigerant going first to the freezing evaporator and thereafter to the upper evaporator, said freezing evaporator being provided on its lateral edges with front and back angle brackets supporting said evaporator in spaced relation to the liner walls on the liner walls, and said rearwardly extending plate being supported at its rear edge by a pair of joining metal struts.

6. In a household refrigerator, the combination of an insulated cabinet having an outer shell and an inner liner separated by insulation, and having a door opening closed by an insulated door, said liner having top, side, and rear walls defining a refrigerated space divided into an upper zone for unfrozen food and a lower zone for frozen food, a pair of spaced insulating sheet members forming a partition separating the refrigerated space into said zones, an upper evaporator comprising a sheet of metal having bends at the corners to conform to the inside of said liner extending across both sides and the back, and having refrigeration coils on the outside thereof, a freezing evaporator located in said frozen food space and comprising a sheet of metal forming substantially horizontal plate and extending from side to side and from front to rear of the frozen food zone, with a clearance on all sides for passage of condensate on the walls, said plate being joined at its front edge to a backwardly and downwardly extending metal evaporator plate, both said plates having sinuous coils mounted thereon, and the sinuous coils being connected together and connected to the coils of the upper evaporator without restriction, the refrigerant going first to the freezing evaporator and thereafter to the upper evaporator, the said sinuous coils being located on the bottom of the horizontal plate of said freezing evaporator and being located on the top of said downwardly and rearwardly extending plate.

7. In a household refrigerator, the combination of an insulated cabinet having an outer shell and an inner liner separated by insulation, and having a door opening closed by an insulated door, said liner having top, side, and rear walls defining a refrigerated space divided into an upper zone for unfrozen food and a lower zone for frozen food, a pair of spaced insulating sheet members forming a partition separating the refrigerated space into said zones, an upper evaporator comprising a sheet of metal having bends at the corners to conform to the inside of said liner extending across both sides and the back, and having refrigeration coils on the outside thereof, a freezing evaporator located in said frozen food space and comprising a sheet of metal forming a substantially horizontal plate and extending from side to side and from front to rear of the frozen food zone, with a clearance on all sides for passage of condensate on the walls, said plate being joined at its front edge to a backwardly and downwardly extending metal evaporator plate, both said plates having sinuous coils mounted thereon, and the sinuous coils being connected together and connected to the coils of the upper evaporator without restriction, the refrigerant going first to the freezing evaporator and thereafter to the upper evaporator, the said sinuous coils being located on the bottom of the horizontal plate of said freezing evaporator and being located on the top of said downwardly and rearwardly extending plate, said sinuous coils on the top of said latter plate comprising forwardly and backwardly extending passes joined by U-bends, and the rearward U-bends being detached and spaced from said latter plate to permit condensate to run under them.

8. A freezing evaporator for the freezing zone of a household refrigerator having a freezing chamber bounded by the walls, back, and bottom of a liner comprising, an aluminum sheet adapted to extend substantially horizontally and provided at its rear end with a depending flange for support on the back of the liner, said aluminum sheet being provided with a bend at its forward end and extending downwardly and backwardly at an acute angle to a point near the rear wall of said liner, sinuous coils carried by said aluminum sheet on the lower side of its upper horizontal portion and sinuous coils carried by the upper side of said downwardly and rearwardly extending sheet on the upper side, these sinuous coils being joined together without restriction to form a freezing evaporator, all of the condensate from said coils dropping on said downwardly and rearwardly extending sheet portion and draining to the rear of said liner to fall on the bottom of the liner substantially without drippage on the contents of the liner below said evaporator, the sinuous coils carried by the upper side of said downwardly and rearwardly extending sheet being detached and spaced from said sheet at its lower end, to permit condensate to run between the coils and the sheet without entrapping condensate above said sheet.

9. A freezing evaporator for the freezing zone of a household refrigerator having a freezing chamber bounded by the walls, back, and bottom of a liner comprising, an aluminum sheet adapted to extend substantially horizontally and provided at its rear end with a depending flange for support on the back of the liner, said aluminum sheet being provided with a bend at its forward end and extending downwardly and backwardly at an acute angle to a point near the rear wall of said liner, sinuous coils carried by said aluminum sheet on the lower side of its upper horizontal portion and sinuous coils carried by the upper side of said downwardly and rearwardly extending sheet on the upper side, these sinuous coils being joined together without restriction to form a freezing evaporator, all of the condensate from said coils dropping on said downwardly and rearwardly extending sheet portion and draining to the rear of said liner to fall on the bottom of the liner substantially without drippage on the contents of the liner below said evaporator, said sinuous coils on the horizontal sheet extending transversely to the sheet from side to side of the liner and being joined by U-bends at each side in one continuous tube, and the sinuous coils on the downwardly extending sheet extending forwardly and backwardly and being joined by U-bends into one continuous tube.

10. A freezing evaporator for the freezing zone of a household refrigerator having a freezing chamber bounded by the walls, back, and bottom of a liner comprising, an aluminum sheet adapted to extend substantially horizontally and provided at its rear end with a depending flange for support on the back of the liner, said aluminum sheet being provided with a bend at its forward end and extending downwardly and backwardly at an acute angle to a point near the rear wall of said liner, sinuous coils carried by said aluminum sheet on the lower side of its upper horizontal portion and sinuous coils carried by the upper side of said downwardly and rearwardly extending sheet on the upper side, these sinuous coils being joined together without restriction to form a freezing evaporator, all of the condensate from said coils dropping on said downwardly and rearwardly extending sheet portion and draining to the rear of said liner to fall on the bottom of the liner substantially without drippage on the contents of the liner below said evaporator, said sinuous coils on the horizontal sheet extending transversely to the sheet from side to side of the liner and being joined by U-bends at each side in one continuous tube, and the sinuous coils on the downwardly extending sheet extending forwardly and backwardly and being joined by U-bends, the rear U-bends on said latter sinuous coils on the downwardly extending sheet being spaced from the sheet at its lower end to permit condensate to run beneath them without trapping condensate at the U-bends.

11. A freezing evaporator for the freezing zone of a household refrigerator having a freezing chamber bounded by the walls, back, and bottom of a liner comprising, an aluminum sheet adapted to extend substantially horizontally and provided at its rear end with a depending flange for support on the back of the liner, said aluminum sheet being provided with a bend at its forward end and extending downwardly and backwardly at an acute angle to a point near the rear wall of said liner, sinuous coils carried by said aluminum sheet on the lower side of its upper horizontal portion and sinuous coils carried by the upper side of said downwardly and rearwardly extending sheet on the upper side, these sinuous coils being joined together without restriction to form a freezing evaporator, all of the condensate from said coils dropping on said downwardly and rearwardly extending sheet portion and draining to the rear of said liner to fall on the bottom of the liner substantially without drippage on the contents of the liner below said evaporator, the said horizontal sheet being provided on its upper side adjacent its rear edge with an enlarged cylindrical accumulator having both of its ends tapered to a tubular formation for receiving refrigerant tubes, the sinuous coils carried by the upper side of said downwardly and rearwardly extending sheet being detached and spaced from said sheet at its lower end, to permit condensate to run between the coils and the sheet without entrapping condensate above said sheet.

12. A freezing evaporator for the freezing zone of a household refrigerator having a freezing chamber bounded by the walls, back, and bottom of a liner comprising, an aluminum sheet adapted to extend substantially horizontally and provided at its rear end with a depending flange for support on the back of the liner, said aluminum sheet being provided with a bend at its forward end and extending downardly and backwardly at an acute angle to a point near the rear wall of said liner, sinuous coils carried by said aluminum sheet on the lower side of its upper horizontal portion and sinuous coils carried by the upper side of said downwardly and rearwardly extending sheet on the upper side, these sinuous coils being joined together without restriction to form a freezing evaporator, all of the condensate from said coils dropping on said downwardly and rearwardly extending sheet portion and draining to the rear of said liner to fall on the bottom of the liner substantially without drippage on the contents of the liner below said evaporator, the said horizontal sheet being provided on its upper side adjacent its rear edge with an enlarged cylindrical accumulator having both of its ends tapered to a tubular formation for receiving refrigerant tubes, the said liner also supporting a second evaporator adjacent its upper end and comprising a sheet extending backwardly on each side wall and across the rear wall of the liner and provided with a pair of passes of refrigerant tubing between the sheet and the liner, said second evaporator being connected without restriction to the freezing evaporator.

13. A freezing evaporator for the freezing zone of a household refrigerator having a freezing chamber bounded by the walls, back, and bottom of a liner comprising, an aluminum sheet adapted to extend substantially horizontally and provided at its rear end with a depending flange for support on the back of the liner, said aluminum sheet being provided with a bend at its forward end and extending downwardly and backwardly at an acute angle to a point near the rear wall of said liner, sinuous coils carried by said aluminum sheet on the lower side of its upper horizontal portion and sinuous coils carried by the upper side of said downwardly and rearwardly extending sheet on the upper side, these sinuous coils being joined together without restriction to form a freezing evaporator, all of the condensate from said coils dropping on said downwardly and rearwardly extending sheet portion and draining to the rear of said liner to fall on the bottom of the liner substantially without drippage on the contents of the liner below said evaporator, the said horizontal sheet being provided on its upper side adjacent its rear edge with an enlarged cylindrical accumulator having both of its ends tapered to a tubular formation for receiving refrigerant tubes, the said liner also supporting a second evaporator adjacent its upper end and comprising a sheet extending backwardly on each side wall and across the rear wall of the liner and provided with a pair of passes of refrigerant tubing between the sheet and the liner, said second evaporator being connected without restriction to the freezing evaporator, the course of the refrigerant being first to the sinuous coils on the lower backwardly extending sheet of the freezing evaporator, and thereafter to the coils of the horizontal sheet of the freezing evaporator, thence to the coils of the upper evaporator and thereafter back to the accumulator and from the accumulator to the suction inlet of a compressor.

14. A freezing evaporator for the freezing zone of a household refrigerator having a freezing chamber bounded by the walls, back, and bottom of a liner comprising, an aluminum sheet adapted to extend substantially horizontally and provided at its rear end with a depending flange for support on the back of the liner, said aluminum sheet being provided with a bend at its forward end and extending downwardly and backwardly at an acute angle to a point near the rear wall of said liner, sinuous coils carried by said aluminum sheet on the lower side of its upper horizontal portion and sinuous coils carried by the upper side of said downwardly and rearwardly extending sheet on the upper side, these sinuous coils being joined together without restriction to form a freezing evaporator, all of the condensate from said coils dropping on said downwardly and rearwardly extending sheet portion and draining to the rear of said liner to fall on the bottom of the liner substantially without drippage on the contents of the liner below said evaporator, the said horizontal sheet being provided on its upper side adjacent its rear edge with an enlarged cylindrical accumulator having both of its ends tapered to a tubular formation for receiving refrigerant tubes, the said accumulator being supported in spaced relation to said horizontal sheet by a pair of angle brackets secured to said sheet and extending upwardly from the sheet to a cylindrical clamping portion extending about tubes leading to and from said accumulator, and supporting the accumulator spaced from the sheet.

References Cited in the file of this patent

UNITED STATES PATENTS

| | | |
|---|---|---|
| 2,091,584 | Brown | Aug. 31, 1937 |
| 2,510,758 | Rundell | June 6, 1950 |